UNITED STATES PATENT OFFICE.

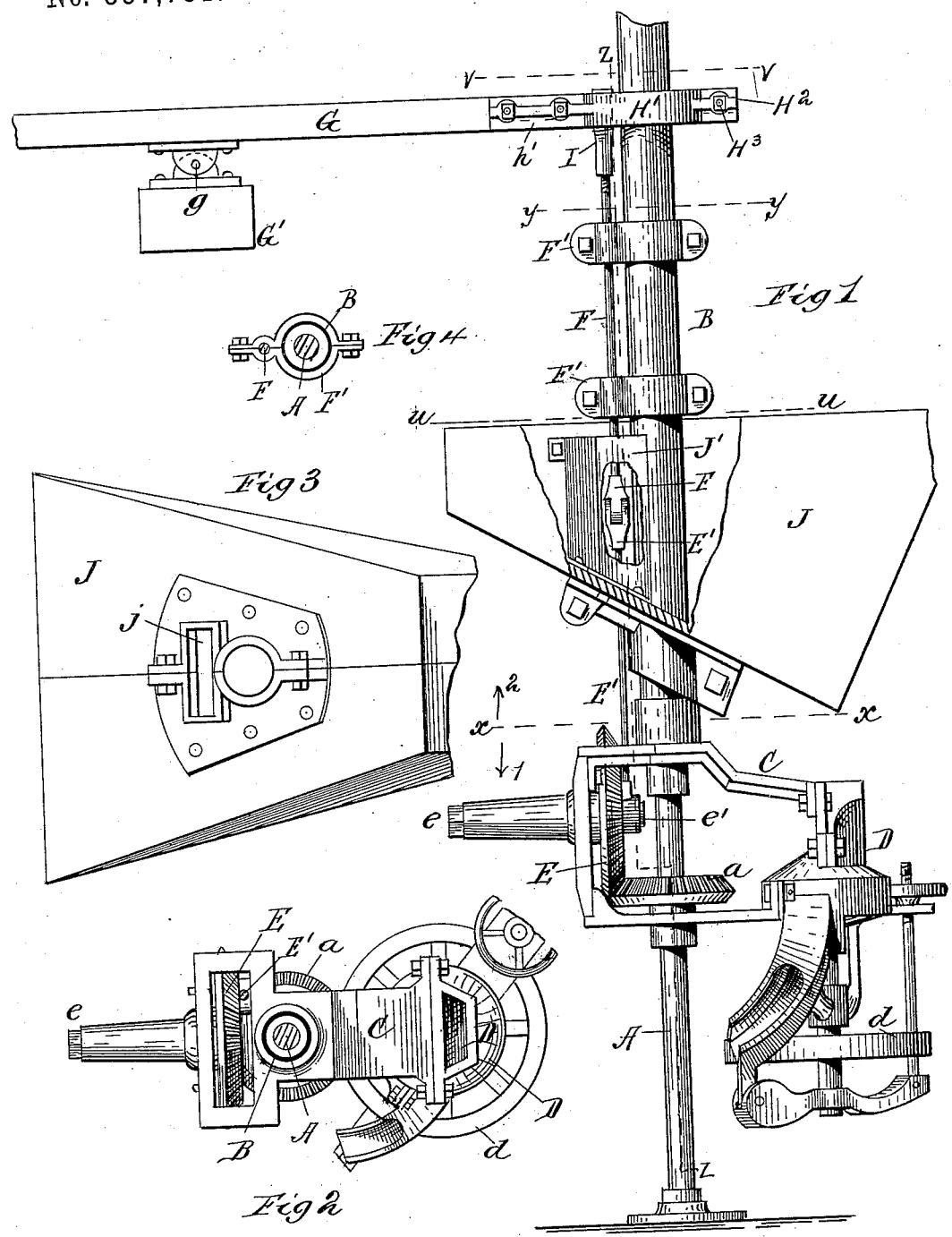

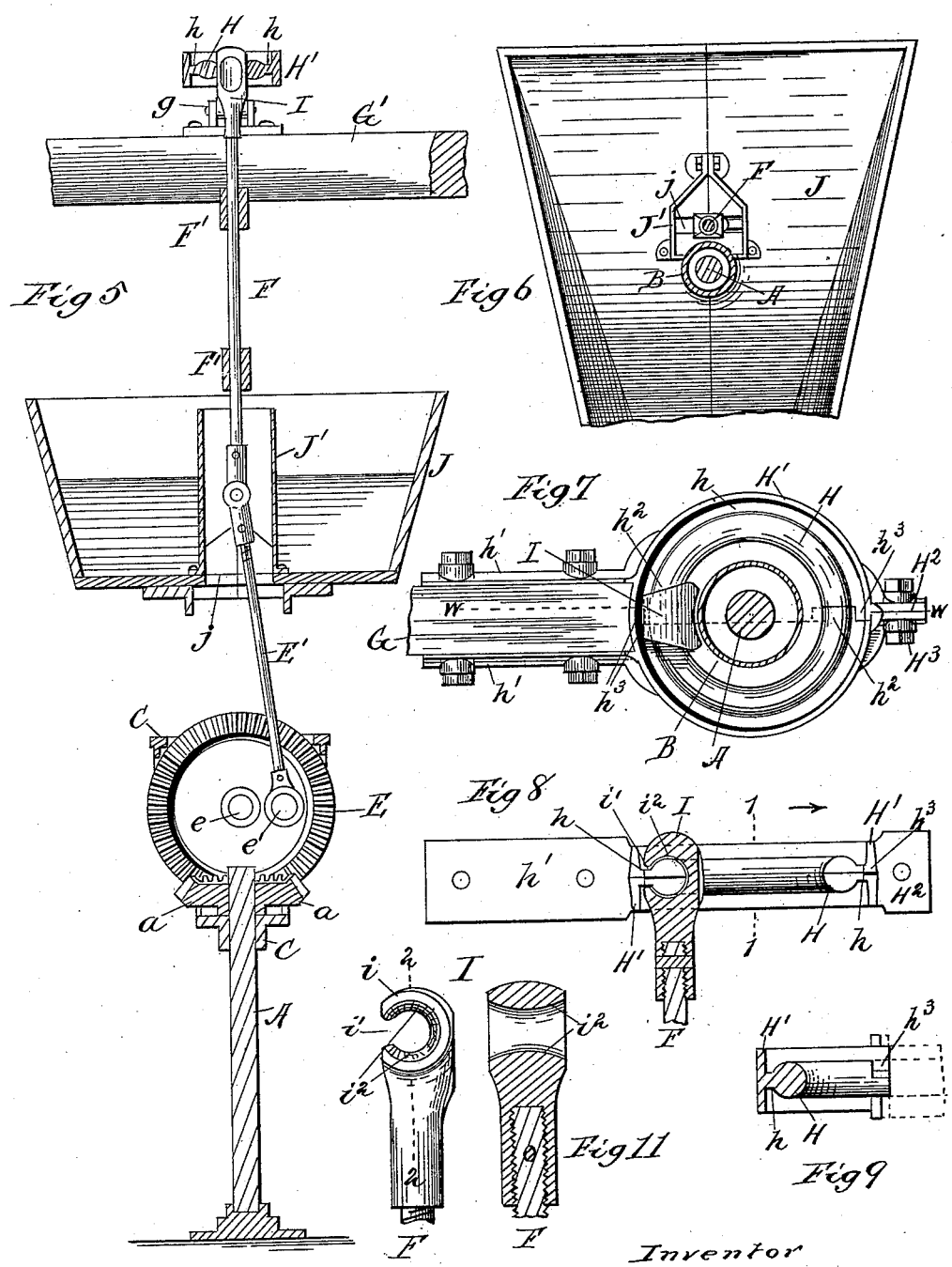

JOHN Q. ADAMS, OF MARSEILLES, ILLINOIS.

WINDMILL.

SPECIFICATION forming part of Letters Patent No. 357,751, dated February 15, 1887.

Application filed June 3, 1886. Serial No. 204,092. (No model.)

*To all whom it may concern:*

Be it known that I, JOHN Q. ADAMS, a citizen of the United States, residing at Marseilles, in the county of La Salle and State of Illinois, have invented a certain new and useful Improvement in Windmills, which is fully set forth in the following specification, reference being had to the accompanying drawings in which—

Figure 1 is a side elevation of the lower portion of a windmill embodying my invention, a portion of the hopper being broken away to show the construction; Fig. 2, a detail plan section taken on the line $x\ x$ of Fig. 1, looking in the direction of the arrow 1; Fig. 3, a detail bottom plan section taken on the line $x\ x$ of Fig. 1, looking in the direction of the arrow 2; Fig. 4, a detail plan section taken on the line $y\ y$ of Fig. 1; Fig. 5, a longitudinal sectional view taken on the line $z\ z$ of Fig. 1; Fig. 6, a detail plan section taken on the line $u\ u$ of Fig. 1; Fig. 7, a detail plan section taken on the line $v\ v$ of Fig. 1; Fig. 8, a sectional view taken on the line $w\ w$ of Fig. 7; Fig. 9, a detail sectional view taken on the line 1 1 of Fig. 8, looking in the direction of the arrow; Fig. 10, a detail view of the hook-box, and Fig. 11 a sectional view of the same taken on the line 2 2 of Fig. 10.

Like letters refer to like parts in all the figures of the drawings.

My present invention relates especially to geared windmills or wind-engines, or, in other words, that class of machines in which the main shaft of the windmill is arranged to drive an upright shaft, which in turn communicates motion to other outside machines; and it is in the nature of an improvement upon the invention set forth in Letters Patent No. 311,937, granted to me February 10, 1885.

The object of my present invention is to provide means whereby the rotary motion of the upright shaft of the windmill may be converted into a reciprocating motion suitable for operating a pump or other similar secondary machine, and to provide for its continuous operation without interruption by the turning of the windmill with the varying direction of the wind.

To these ends my invention consists in certain novel features, which I will now proceed to describe, and will then particularly point out in the claims.

In the drawings, A represents the upright shaft, and B the tube surrounding the same and connected at its upper end to the turn-table, upon which the main shaft and wind-wheel are mounted. In the present instance I have only shown the lower portion of this shaft and tube, the upper portion being constructed substantially as set forth in my Letters Patent hereinbefore specified.

C indicates a bracket-frame or yoke carried by the tube B, to the lower end of which it is attached. I have shown mounted on one side of this bracket-frame a grinding-mill, D, constructed substantially as set forth in my Letters Patent hereinbefore specified, and driven from the upright shaft A by means of suitable gearing, the mill-shaft being provided with a fly-wheel or balance-wheel, $d$, but being in other respects similar to the mill set forth in my prior patent.

The features so far described appear in the construction already patented to me, and therefore form in themselves no part of my present invention.

A bevel-gear, $a$, is mounted on the shaft A, preferably at the point shown, above the lower arm of the bracket-frame C, and this bevel-gear meshes with a corresponding bevel-gear, E, which is mounted on a short shaft, $e$, arranged in suitable bearings in the bracket-frame C. The bevel-gear E is provided, preferably on its inner face, as shown, with a wrist-pin, $e'$, on which is pivoted one end of a pitman, E', the other end of which is pivoted to the lower extremity of a connecting-rod, F. This connecting-rod reciprocates vertically, being steadied and guided by means of guides F', attached to the tube B, as shown more particularly in Figs. 1 and 4 of the drawings. These guides are shown in the present instance as two in number; but it is obvious that a greater or less number may be employed, if desired. They are preferably constructed in the manner shown in Fig. 4, being divided longitudinally into two halves, which embrace the tube and the connecting-rod, as shown, the two halves being connected by bolts, as shown. G represents a walking-beam, which is fulcrumed at $g$ upon a cross-beam, G', supported in any suitable manner. The outer end of this beam is suitably connected to the pump or other machine which it is desired to operate, the inner end being provided with a circular bearing for the upper end of the connecting-rod, which circular bearing surrounds the tube B, and consequently the upright shaft A, which is arranged within the said tube. This circular bearing is preferably constructed in the manner shown in detail in Figs. 7, 8, and 9 of the drawings, and consists of an inner ring, H, round or circular in cross-section, connected by a web or flange, $h$, to an outer circular band or flange, H'. The entire bearing is made in two parts, divided approximately upon a central line and having extension-pieces $h'$, by means of which the two halves are bolted firmly to the end of the walking-beam G. The division of the two parts is not made, however, upon a straight line or plane, the two sections being halved onto each other by means of rabbeted tongues $h^2$ and $h^3$, which prevent, by their interlocking, any disarrangement of the two halves or sections, which would tend to throw them out of their proper relative position. At that point of the circular bearing which is opposite the end of the walking-beam G the two sections are provided with lugs $H^2$, through which a bolt, $H^3$, passes, in order to additionally connect the two sections.

The connection between the walking-beam G and connecting-rod F is effected by means of a device, I, which I term a "hook-box." This hook-box is firmly connected to or formed in one piece with the upper extremity of the connecting-rod F, and terminates at its upper end in a hook, $i$, which forms almost a complete circle, being cut away, however, as shown at $i'$, in order to accommodate the web or flange $h$, as shown more particularly in Fig. 8. The aperture formed by the hook $i$ is flaring in both directions, a transverse section, as shown in Fig. 11, making it apparent that the inner wall of the said aperture is curved in the arc of a circle, or approximately so, as shown at $i^2$, for the purposes hereinafter stated.

J indicates the hopper or reservoir which is employed in conjunction with the grinding-mill D. This reservoir is connected, as in my prior patent hereinbefore referred to, to the tube B in any suitable manner, and the pitman E', being arranged close to the tube, extends up through an aperture, $j$, in the bottom of the said reservoir, and is connected to the lower end of the connecting-rod F within the same.

In order to prevent the contents of the hopper or reservoir from interfering with the action of these parts and from escaping through the aperture $j$, I employ a guard, J', which surrounds these parts within the reservoir, extending upward from the edge of the aperture J, and preventing any contact of the contents of the reservoir with the pitman and connecting-rod, and any escape of the same through the said aperture, in an obvious manner.

The operation of my improved windmill will be readily understood from the preceding description. It is obvious that as the gearing and connecting mechanism which operate the walking-beam are fastened to the tube, so as to move with the turn-table, there is no tendency to turn the wind-wheel out of the wind when the device is in operation, as is fully set forth in my prior Letters Patent hereinbefore specified. During this rotation of the tube and the connecting parts the hook-box will travel around upon the circular bearing in an obvious manner, so as to operate the walking-beam in any position which it may assume. The double curvature of the inner surface of the hook-box permits it to work freely upon the bearing, whether it be in line with the central line of the walking-beam, as in the position shown in the several figures, or at any other point in the circle, since this curvature will allow the rocking motion of the beam without causing the hook-box to bind upon the bearing.

It is obvious that changes may be made in many details of construction set forth without departing from the principle of my invention. For instance, although I have shown a particular form of gearing and connecting mechanism mounted on the tube for operating the walking-beam, still it is obvious that any well-known equivalent for this gearing and connections may be employed. Moreover, although I have described my invention as more particularly adapted to operate a pump, still it is evident that it may be employed to transmit the reciprocating motion of the walking-beam to any apparatus or machine which is adapted to be operated by such means. I therefore do not wish to be understood as limiting myself strictly to the precise details of construction hereinbefore described, and shown in the drawings.

Having thus described my invention, what I claim as new, and desire to protect by Letters Patent, is—

1. In a windmill, a tube surrounding the vertical shaft and attached to the turn-table, in combination with an independently-mounted walking-beam and connecting operating mechanism carried by the tube, substantially as and for the purposes specified.

2. In a windmill, a tube surrounding the vertical shaft and attached to the turn-table, in combination with an independently-mounted walking-beam provided with a circular bearing surrounding the tube, and operating mechanism connected to the said bearing and carried by the tube, substantially as and for the purposes specified.

3. In a windmill, a tube surrounding the vertical shaft and attached to the turn-table, in combination with an independently-mounted walking-beam provided with a circular bearing surrounding the tube, a reciprocating rod carried by the tube and connected to the said bearing, and suitable gearing carried by the tube, driven from the vertical shaft and provided with a pitman to operate the reciprocating rod, substantially as and for the purposes specified.

4. In a windmill, a tube surrounding the vertical shaft and attached to the turn-table, in combination with an independently-mounted walking-beam provided with a circular bearing surrounding the tube, a rod, F, connected to the said bearing and reciprocating in guides attached to the tube, a pitman E', and bevel-gears E and $a$, substantially as and for the purposes specified.

5. The combination, with the tube B, having a reservoir, J, attached thereto, and the walking-beam G, of the gearing, pitman-rod, and connecting-rod mounted on the tube, the said rods extending through the reservoir, and a guard surrounding the said rods within the reservoir, substantially as and for the purposes specified.

6. The combination, with the independently-mounted walking-beam provided with a circular bearing, H, of the connecting-rod F, carried by the tube and provided with a hook-box, I, at its upper end to engage with and travel on the said circular bearing, substantially as and for the purposes set forth.

7. The combination, with the walking-beam G, provided with a circular bearing, H, connected to the outer band, H', by means of a web, $h$, of the connecting-rod F, carried by the tube and provided with hook-box I, having a hook, $i$, at its upper extremity, cut away at $i'$ to accommodate the said web, substantially as and for the purposes specified.

8. The combination, with the walking-beam G, having circular bearings H, of the connecting-rod F, carried by the tube and provided with hook-box I, to engage the said bearing, the said hook-box having flaring or curved inner walls, $i^2$, substantially as and for the purposes specified.

9. In a windmill, the combination, with the walking-beam, of the circular bearing constructed in two sections suitably connected to each other and to the beam, the said sections being provided with rabbeted tongues $h^2$ and $h^3$, to interlock and prevent disarrangement of the sections, and the connecting-rod F, provided with a hook-box, I, at its upper end to engage and travel on the said circular bearing, substantially as and for the purposes specified.

JOHN Q. ADAMS.

Witnesses:
CHAS. A. WARD,
H. R. ADAMS.